United States Patent
Chen et al.

(10) Patent No.: US 12,421,443 B2
(45) Date of Patent: Sep. 23, 2025

(54) VISCOSITY REDUCER COMPOSITIONS, METHODS FOR PRODUCING, AND METHODS OF USING

(71) Applicant: Saudi Arabian Oil Company, Dhahran (SA)

(72) Inventors: Shaohua Chen, Beijing (CN); Ming Han, Dhahran (SA); Abdulkareem AlSofi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 48 days.

(21) Appl. No.: 18/325,593

(22) Filed: May 30, 2023

(65) Prior Publication Data
US 2023/0323192 A1    Oct. 12, 2023

Related U.S. Application Data

(63) Continuation of application No. PCT/CN2021/142680, filed on Dec. 29, 2021.

(51) Int. Cl.
*C09K 8/584* (2006.01)
*C09K 8/588* (2006.01)

(52) U.S. Cl.
CPC .............. *C09K 8/584* (2013.01); *C09K 8/588* (2013.01)

(58) Field of Classification Search
None
See application file for complete search history.

(56) References Cited

U.S. PATENT DOCUMENTS

| | | | | |
|---|---|---|---|---|
| 4,223,733 A * | 9/1980 | Bodor | ...... | C04B 28/02 106/719 |
| 6,045,591 A * | 4/2000 | Deneulenaere | ...... | D06P 1/0024 8/618 |
| 6,173,778 B1 * | 1/2001 | Rae | ...... | C09K 8/506 166/293 |
| 6,230,804 B1 * | 5/2001 | Mueller | ...... | E21B 41/0042 166/293 |
| 6,626,243 B1 * | 9/2003 | Go Boncan | ...... | C09K 8/46 166/293 |
| 6,832,652 B1 * | 12/2004 | Dillenbeck | ...... | C04B 28/02 166/293 |
| 10,053,641 B2 | 8/2018 | Bello | | |

(Continued)

FOREIGN PATENT DOCUMENTS

| CN | 101235279 A | 8/2008 |
|---|---|---|
| CN | 101596428 A | 12/2009 |
| CN | 109575902 A | 4/2019 |

OTHER PUBLICATIONS

Derakhshesh et al., "Occlusion of Polyaramatic Componds in Asphaltene Precipitates Suggests Porous Nagoaggregates", Energy & Fuels, vol. 27, pp. 1748-1751, 2013.

(Continued)

*Primary Examiner* — John J Figueroa
(74) *Attorney, Agent, or Firm* — DINSMORE & SHOHL LLP

(57) ABSTRACT

A viscosity reducer composition may include one or more polycyclic compounds, one or more polymers covalently attached to one or more polyaromatic compounds, one or more rheology modifiers, one or more surfactants, and an aqueous solution.

20 Claims, 7 Drawing Sheets

(56) References Cited

U.S. PATENT DOCUMENTS

| | | | | |
|---|---|---|---|---|
| 2002/0157575 | A1* | 10/2002 | DiLullo | C09K 8/46 |
| | | | | 106/711 |
| 2004/0157749 | A1* | 8/2004 | Ely | C09K 8/575 |
| | | | | 507/200 |
| 2009/0078414 | A1* | 3/2009 | Horvath Szabo | E21B 43/16 |
| | | | | 166/263 |
| 2012/0208728 | A1* | 8/2012 | Fleming | C09K 8/5086 |
| | | | | 423/325 |
| 2015/0315457 | A1 | 11/2015 | Ali et al. | |
| 2019/0177222 | A1* | 6/2019 | Dighe | C04B 14/062 |
| 2020/0199441 | A1 | 6/2020 | Sun et al. | |

OTHER PUBLICATIONS

Wang et al., "Synergistic Collaboration between a Viscosity Reducer and a Surfactant for in Situ Emulsion Formation to Enhance Heavy-Oil Recovery", Energy & Fuels, vol. 34, pp. 95-102, 2020.

Yang et al., "A New Composite Viscosity Reducer with both Asphaltene Dispersion and Emulsifying Capaqbility for Heavy and Ultra-Heavy Crude Oils", Energy & Fuels, accepted manuscript, DOI: 10.1021/acs.energyfuels.6b02265, Jan. 11, 2017.

International Search Report and Written Opinion pertaining to Application No. PCT/CN2021/142680 dated Sep. 23, 2022.

* cited by examiner

VISCOSITY REDUCER COMPOSITIONS, METHODS FOR PRODUCING, AND METHODS OF USING

CROSS-REFERENCE To RELATED APPLICATIONS

This Application is a continuation of International Application No PCT/CN2021/142680, filed Dec. 29, 2021, the entire contents of which are incorporated herein by reference.

FIELD

Embodiments disclosed herein generally relate to viscosity reducers, and more specifically to water-soluble viscosity reducer compositions and methods of producing.

TECHNICAL BACKGROUND

Viscosity reducer compositions are desired in a variety of applications including, but not limited to, oil extraction and well fluid transport. Extracting hydrocarbons from within a formation may require drilling a hole from the surface to the geological formation. Specialized drilling techniques and materials are utilized to form a wellbore hole and enable the extraction of hydrocarbons. Specialized materials may be used to transport well fluids into a well. A wellbore is a hole that extends from the surface to a location below the surface to permit access to formations. The wellbore contains at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore. The fluid conduit may be defined by one or more tubular strings, such as casings, inserted into the wellbore and secured in the wellbore. Exemplary equipment connected at the surface to the fluid conduit includes, but is not limited to, pipelines, tanks, pumps, compressors, and flares. The fluid conduit may be large enough to permit introduction and removal of mechanical devices, including but not limited to tools, drill strings, sensors, and instruments, into and out of the interior of the well bore. The flow of fluid in the fluid conduit must be maintained at a certain level for the wellbore to remain economically viable.

SUMMARY

Extraction of hydrocarbons in reactive formations involves the transport of oil inside an injection well to the surface of the formation through the fluid conduit. However, extraction of heavy oil that has a high viscosity is difficult to transport. Therefore, an ongoing need exists for viscosity reducer compositions and methods for producing the same, such that the flow of fluid in a wellbore fluid conduit may be maintained.

These needs are met by the embodiments disclosed herein. One or more embodiments disclosed herein provide viscosity reducer compositions that may comprise one or more polycyclic compounds, one or more polymers covalently attached to one or more polyaromatic compounds, one or more rheology modifiers, one or more surfactants, and an aqueous solution; wherein the one or more polycyclic compounds are selected from the group consisting of a compound of formula (1), a compound of formula (2), a compound of formula (3), a compound of formula (4), and a compound of formula (5):

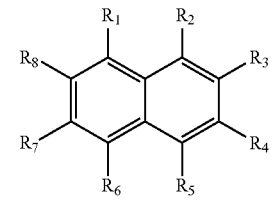

(1)

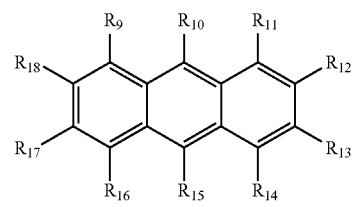

(2)

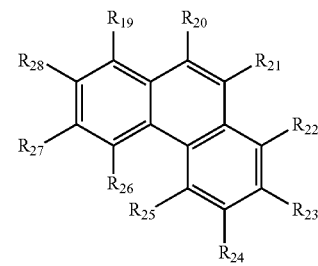

(3)

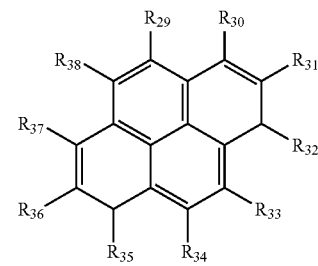

(4)

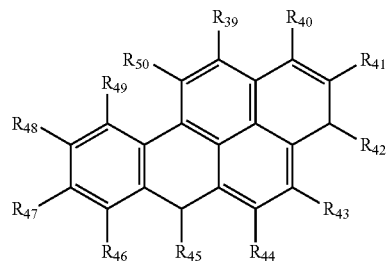

(5)

in which $R_1$-$R_{50}$ are each independently H, ($C_1$-$C_{20}$) hydrocarbyl, ($C_1$—$C_{20}$) heterohydrocarbyl, ($C_1$-$C_{20}$)carbonyl, or ($C_1$-$C_{20}$)hydroxyl.

According to aspects, a method of producing a viscosity reducer composition comprises attaching covalently poly (ethylene glycol) to one or more polyaromatic hydrocarbons, thus producing a poly(ethylene glycol) modified with polyaromatic hydrocarbons; combining the poly(ethylene glycol) modified with polyaromatic hydrocarbons with one or more rheology modifiers, an aqueous solution, and one or more polycyclic compounds, to form a suspended solution precursor, wherein the one or more polycyclic compounds is selected from the group consisting of the compound of formula (1), the compound of formula (2), the compound of formula (3), the compound of formula (4), and the compound of formula (5), in which $R_1$-$R_{50}$ are each independently H, $(C_1$-$C_{20})$hydrocarbyl, $(C_1$-$C_{20})$heterohydrocarbyl, $(C_1$-$C_{20})$carbonyl, or $(C_1$-$C_{20})$hydroxyl; stirring the suspended solution precursor to form a suspended solution; adding one or more surfactants to the suspended solution to form a viscosity reducer composition precursor; and stirring the viscosity reducer composition precursor to form a viscosity reducer composition.

According to aspects, a method of reducing the viscosity of crude oil comprises forming a viscosity reducer composition, wherein the viscosity reducer composition comprises one or more polycyclic compounds, one or more polymers covalently attached to one or more polyaromatic compounds, one or more rheology modifiers, one or more surfactants, and an aqueous solution; wherein the one or more polycyclic compounds are selected from the group consisting of the compound of formula (1), the compound of formula (2), the compound of formula (3), the compound of formula (4), and the compound of formula (5); and combining the viscosity reducer composition and crude oil to form an emulsion, wherein the emulsion has a volume ratio of the crude oil to the viscosity reducer composition from 50:50 to 90:10, thereby reducing the viscosity of the crude oil.

This summary is provided to introduce a selection of concepts that are further described in the detailed description. This summary is not intended to identify key or essential features of the claimed subject matter, nor is it intended to be used as an aid in limiting the scope of the claimed subject matter.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the drawings and the claims.

Figure 1:
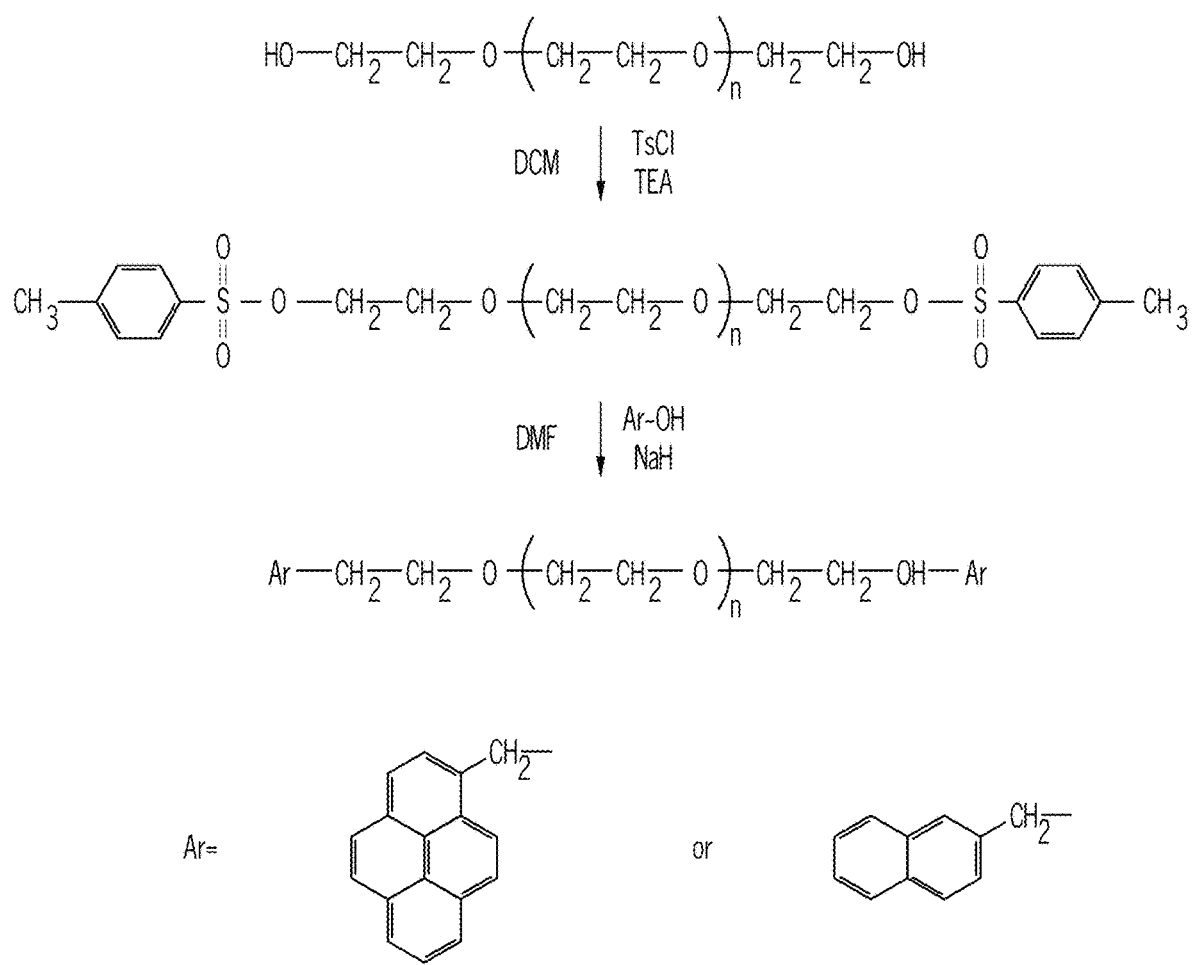
FIG. 1 is a representative chemical reaction diagram, according to one or more embodiments described herein.

Reference will now be made in greater detail to various embodiments, some embodiments of which are illustrated in the accompanying drawings.

DETAILED DESCRIPTION

Embodiments disclosed herein include viscosity reducer compositions. More specifically, some embodiments disclosed herein are directed to water-soluble viscosity reducer compositions. In particular, some embodiments disclosed herein are directed toward water-soluble viscosity reducer compositions, and methods of producing said viscosity reducer compositions. In some embodiments, a viscosity reducer composition may be combined with crude oil, which may significantly reduce the viscosity of crude oil, and therefore optimize the economics of hydrocarbon extraction.

In one or more embodiments, the viscosity reducer compositions may comprise one or more polycyclic compounds, one or more polymers covalently attached to one or more polyaromatic compounds, one or more polymers covalently attached to one or more polyaromatic compounds, one or more rheology modifiers, one or more surfactants, and an aqueous solution.

In one or more embodiments, the viscosity reducer compositions may comprise one or more polycyclic compounds selected from the group consisting of a compound of formula (1), a compound of formula (2), a compound of formula (3), a compound of formula (4), and a compound of formula (5):

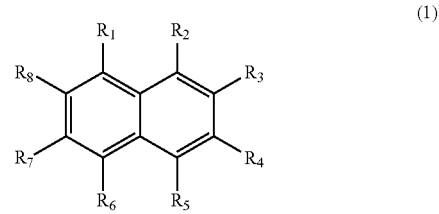

(1)

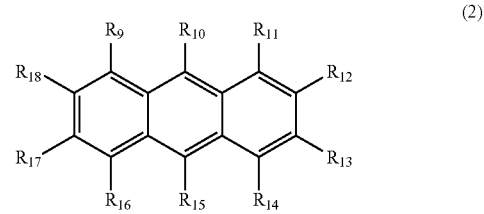

(2)

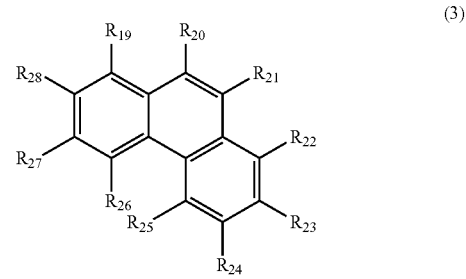

(3)

-continued (4)

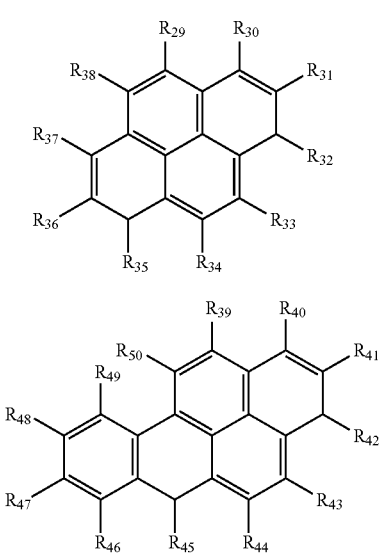

(5)

in which $R_1$-$R_{50}$ are each independently H, $(C_1-C_{20})$hydrocarbyl, $(C_1-C_{20})$heterohydrocarbyl, $(C_1-C_{20})$carbonyl, or $(C_1-C_{20})$hydroxyl.

When used to describe certain carbon atom-containing chemical groups, an expression having the form "$R_1$-$R_{50}$" refers to each $R_x$, group within the range from $R_1$ to $R_{50}$, inclusive of 1 and 50. For example, an expression having the form "$R_1$-$R_5$" refers to $R_1$, $R_2$, $R_3$, $R_4$, and $R_5$.

The term "independently selected" is used herein to indicate that the substituent groups, such as, $R_1$, $R_2$, $R_3$, $R_4$, and $R_5$, can be identical or different (e.g., $R_1$, $R_2$, $R_3$, $R_4$, $R_5$, may all be substituted alkyls or $R_4$ and $R_5$ may be a cyclic aryl and $R_6$ and $R_7$ may be a substituted alkyl, etc.) A chemical name associated with a substituent group is intended to convey the chemical structure that is recognized in the art as corresponding to that of the chemical name. Thus, chemical names are intended to supplement and illustrate, not preclude, the structural definitions known to those of skill in the art.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{20})$hydrocarbyl is a hydrocarbyl group having from 1 to 20 carbon atoms in its unsubstituted form.

As used herein, the term "hydrocarbyl" refers to a hydrocarbyl radical composed entirely of carbon and hydrogen atoms. An expression such as "$(C_x-C_y)$hydrocarbyl" refers to a hydrocarbyl having from x to y carbon atoms. For instance, a $(C_1-C_5)$hydrocarbyl includes methyl, ethyl, propyl, the butyls, and the pentyls.

As used herein, the term "heterohydrocarbyl" refers to a radical composed of carbon, hydrogen, and at least one heteroatom. In embodiments, the at least one heteroatom may be, but not limited to, oxygen, nitrogen, sulfur, phosphorous, chlorine, bromine, iodine and a combination of two or more of these. For instance, a $(C_1-C_5)$heterohydrocarbyl would include, among others, bromomethyl, chlorobutyl, and phosphoropentyl.

As used herein, the term "carbonyl" refers to a radical composed of carbon, hydrogen and at least one oxygen atom double-bonded to a carbon atom. For instance, a $(C_1-C_5)$ carbonyl would include, among others, ethylcarbonyl and pentylcarbonyl.

As used herein, the term "hydroxyl" refers to a radical composed of carbon, hydrogen and at least one oxygen atom bonded to both a carbon atom and a hydrogen atom. For instance, a $(C_1-C_5)$carbonyl would include, among others, methyl hydroxyl and the butylhydroxyls.

As used herein, the term "polymer" may refer to a chemical compound or mixture of compounds containing macromolecules composed of repeating subunits, wherein the number of repeating units is 5 or greater.

As used herein, the term "formation" refers to a body of rock that is sufficiently distinctive and continuous that it can be mapped, and may include a geologic region containing hydrocarbons, such as crude oil, hydrocarbon gases, or both, which may be extracted from the subterranean geologic region, among others.

As used herein, the term "fluid" may include liquids, gases, or both.

Some embodiments disclosed herein are directed to viscosity reducer compositions and methods of producing viscosity reducer compositions. The viscosity reducer compositions disclosed herein may comprise one or more polycyclic compounds, one or more polymers covalently attached to one or more polyaromatic compounds, one or more rheology modifiers, one or more surfactants, and an aqueous solution.

In some embodiments, the viscosity reducer composition may comprise one or more polycyclic compounds comprising a $(C_1-C_{20})$hydrocarbyl, a $(C_1-C_{20})$heterohydrocarbyl, a $(C_1-C_{20})$carbonyl, a $(C_1-C_{20})$hydroxyl, or combinations thereof.

In some embodiments, the viscosity reducer composition may comprise one or more polycyclic compounds selected from the group consisting of pyrene, methylpyrene, benzo[α]pyrene, pyrenemethanol, pyrenebutanol, pyrenebutyric acid, naphthalene, anthracene, phenanthrene, methylnaphthalene, naphthalenemethanol, and combinations thereof.

In some embodiments, the viscosity reducer composition may comprise one or more polycyclic compounds, including but not limited to, pyrene, methylpyrene, benzo[α]pyrene, pyrenemethanol, pyrenebutanol, pyrenebutyric acid, naphthalene, anthracene, phenanthrene, methylnaphthalene, naphthalenemethanol, or combinations thereof.

In some embodiments, the viscosity reducer composition may comprise from 0.01 wt. % to 5 wt. % polycyclic compounds based on the total weight of the viscosity reducer composition. In some embodiments, the viscosity reducer composition may comprise from 0.01 wt. % to 5 wt. %, from 0.01 wt. % to 4 wt. %, from 0.01 wt. % to 3 wt. %, from 0.01 wt. % to 2 wt. %, from 0.01 wt. % to 1 wt. %, from 0.01 wt. % to 0.5 wt. %, from 0.01 wt. % to 0.1 wt. %, from 0.1 wt. % to 5 wt. %, from 0.1 wt. % to 4 wt. %, from 0.1 wt. % to 3 wt. %, from 0.1 wt. % to 2 wt. %, from 0.1 wt. % to 1 wt. %, from 0.1 wt. % to 0.6 wt. %, from 0.1 wt. % to 0.5 wt. %, from 0.2 wt. % to 5 wt. %, from 0.2 wt. % to 4 wt. %, from 0.2 wt. % to 3 wt. %, from 0.2 wt. % to 2 wt. %, from 0.2 wt. % to 1 wt. %, or from 0.2 wt. % to 0.5 wt. % of the polycyclic compounds based on the total weight of the viscosity reducer composition.

Without being bound by any particular theory, it is believed that the polycyclic compounds of the viscosity reducer composition may interact with colloids and asphaltene in crude oil, which may reduce the intermolecular Van-der-Waals force, the dipole force, the hydrogen bonding between asphaltene molecules, or combinations of these, thus breaking down a portion of the overlapping and stacking structures formed by the aggregated asphaltenes which may reduce the viscosity of crude oil.

In some embodiments, the viscosity reducer composition may comprise one or more polymers covalently attached to one or more polyaromatic compounds. In some embodiments, the one or more polymers consist of poly(ethylene glycol). In some embodiments, the one or more polymers may comprise poly(ethylene glycol). In some embodiments, the one more polymers may comprise polyethylene. In some embodiments, the one or more polymers may be water-soluble polymers, including but not limited to polyacrylamide, polyacrylic acid, cellulose, polymaleic anhydride, and polyvinylpyrrolidone.

In some embodiments, the viscosity reducer composition may comprise one or more polymers covalently attached to one or more polyaromatic compounds. In some embodiments, the one or more polyaromatic compounds is selected from the group consisting of pyrenyl groups, naphthyl groups, and combinations thereof. In some embodiments, the one or more polyaromatic compounds may comprise pyrenyl groups, naphthyl groups, or combinations thereof. In some embodiments, the one or more polyaromatic compounds may comprise benzene, naphthalene, biphenyl, fluorene, anthracene, phenanthrene, phenalene, tetracene, chrysene, triphenylene, pyrene, pentacene, perylene, benzo[a]pyrene, corannulene, benzo[ghi]perylene, coronene, ovalene, benzo[c]fluorine, or combinations thereof.

In some embodiments, the one or more polymers may have an average molecular weight of from 500 grams per mole (g/mol) to 10,000 g/mol as measured before covalently attaching one or more polyaromatic compounds to the polymer. For example, the one or more polymers may have an average molecular weight of from 500 g/mol to 10,000 g/mol, from 500 g/mol to 5,000 g/mol, from 500 g/mol to 2000 g/mol, from 500 g/mol to 1000 g/mol, from 1000 g/mol to 10,000 g/mol, from 1000 g/mol to 5,000 g/mol, from 1000 g/mol to 2000 g/mol, from 1500 g/mol to 10,000 g/mol, from 1500 g/mol to 5,000 g/mol, from 1500 g/mol to 2000 g/mol, or from 1900 g/mol to 2100 g/mol as measured before covalently attaching one or more polyaromatic compounds to the polymer. In some embodiments, the one or more polymers may have an average number of repeating units from 5 to 250. For example, the one or more polymers may have an average number of repeating units from 5 to 250, from 5 to 200, from 5 to 150, from 5 to 100, from 5 to 75, from 5 to 50, from 5 to 25, from 10 to 250, from 10 to 200, from 10 to 150, from 10 to 100, from 10 to 75, from 10 to 50, from 10 to 25, from 20 to 250, from 20 to 200, from 20 to 150, from 20 to 100, from 20 to 75, from 20 to 50, from 30 to 250, from 30 to 200, from 30 to 150, from 30 to 100, from 30 to 75, from 30 to 50, from 40 to 250, from 40 to 200, from 40 to 150, from 40 to 100, from 40 to 75, or from 40 to 50.

In some embodiments, the viscosity reducer composition may comprise from 0.01 wt. % to 5 wt. % polymers covalently attached to one or more polyaromatic compounds based on the total weight of the viscosity reducer composition. In some embodiments, the viscosity reducer composition may comprise from 0.01 wt. % to 5 wt. %, from 0.01 wt. % to 4 wt. %, from 0.01 wt. % to 3 wt. %, from 0.01 wt. % to 2 wt. %, from 0.01 wt. % to 1 wt. %, from 0.01 wt. % to 0.5 wt. %, from 0.01 wt. % to 0.1 wt. %, from 0.1 wt. % to 5 wt. %, from 0.1 wt. % to 4 wt. %, from 0.1 wt. % to 3 wt. %, from 0.1 wt. % to 2 wt. %, from 0.1 wt. % to 1 wt. %, from 0.1 wt. % to 0.5 wt. %, from 0.1 wt. % to 0.4 wt. %, from 0.2 wt. % to 5 wt. %, from 0.2 wt. % to 4 wt. %, from 0.2 wt. % to 3 wt. %, from 0.2 wt. % to 2 wt. %, from 0.2 wt. % to 1 wt. %, or from 0.2 wt. % to 0.5 wt. % of the polymers covalently attached to one or more polyaromatic compounds based on the total weight of the viscosity reducer composition.

Without being bound by any particular theory, it is believed that the one or more polymers covalently attached to one or more polyaromatic compounds of the viscosity reducer composition may provide a hydrophobic portion and a hydrophilic portion, where the hydrophobic portion includes the polyaromatic compounds that interact with heavy oil components, such as asphaltenes, and the hydrophilic portion includes the polymer that remains in the aqueous phase to break down, disperse and/or solubilize heavy oil. Additionally, it is believed that the one or more polymers covalently attached to one or more polyaromatic compounds of the viscosity reducer composition may interact with a resin and asphaltenes in heavy oil to reduce the intermolecular Van-der-Waals force, the dipole force, the hydrogen bonding between asphaltene molecules, or any combination of these. Further, it is believed that the overlapping and stacking structures formed by aggregated asphaltenes in heavy oil are reduced, resulting in a decrease of the viscosity of the heavy oil.

In some embodiments, the viscosity reducer composition comprises one or more rheology modifiers. In some embodiments, the one or more rheology modifiers is selected from the group consisting of poly(ethylene oxide), xanthan gum, soluble starch, sodium methylcellulose, and combinations thereof. In some embodiments, the one or more rheology modifiers comprise poly(ethylene oxide), xanthan gum, soluble starch, sodium methylcellulose, or combinations thereof. In some embodiments, a surfactant can be added to improve the solubility of poly(ethylene oxide) in the viscosity reducer compositions. For example, the addition of dodecyl trimethyl ammonium chloride (DTAC) to the viscosity reducer composition may improve the solubility of poly(ethylene oxide) in the viscosity reducer composition.

In some embodiments, the rheology modifier may modify certain properties of the viscosity reducer composition, including but limited to the viscosity. Without being bound by any particular theory, it is believed that an increased concentration of the one or more rheology modifiers of the viscosity reducer composition may increase the viscosity of the viscosity reducer composition, which may result in increasing a mobility ratio between the heavy oil and the injected fluid comprising the viscosity reducer composition. Further, it is believed that the increasing mobility ratio may increase a volumetric sweep efficiency for heavy oil displacement, which may produce a greater amount of heavy crude oil.

In some embodiments, the viscosity reducer composition may comprise from 0.01 wt. % to 5 wt. % rheology modifiers based on the total weight of the viscosity reducer composition. In some embodiments, the viscosity reducer composition may comprise from 0.01 wt. % to 5 wt. %, from 0.01 wt. % to 4 wt. %, from 0.01 wt. % to 3 wt. %, from 0.01 wt. % to 2 wt. %, from 0.01 wt. % to 1 wt. %, from 0.01 wt. % to 0.5 wt. %, from 0.01 wt. % to 0.1 wt. %, from 0.04 wt. % to 0.06 wt. %, from 0.1 wt. % to 5 wt. %, from 0.1 wt. % to 4 wt. %, from 0.1 wt. % to 3 wt. %, from 0.1 wt. % to 2 wt. %, from 0.1 wt. % to 1 wt. %, from 0.1 wt. % to 0.5 wt. %, from 0.2 wt. % to 5 wt. %, from 0.2 wt. % to 4 wt. %, from 0.2 wt. % to 3 wt. %, from 0.2 wt. % to 2 wt. %, from 0.2 wt. % to 1 wt. %, or from 0.2 wt. % to 0.5 wt. % of the rheology modifiers based on the total weight of the viscosity reducer composition.

In some embodiments, the viscosity reducer composition comprises one or more surfactants. In some embodiments, the one or more surfactants comprise at least a non-ionic surfactant and a cationic surfactant.

Examples of non-ionic surfactants that can be used in the viscosity reducer compositions of the present disclosure include, but are not limited to, to, long chain alcohols that exhibit surfactant properties, such as cetyl alcohol, stearyl alcohol, cetostearyl alcohol, oleyl alcohol, and other fatty alcohols; other long chain alcohols with surfactant properties include polyethylene glycol alkyl ethers, such as octaethylene glycol monododecyl ether and pentaethylene glycol monododecyl ether; polypropylene glycol alkyl ethers; glucoside alkyl ethers, such as decyl glucoside, lauryl glucoside, and octyl glucoside; polyethylene glycol octylphenyl ethers, such as Triton X-100; polyethylene glycol alkylphenyl ethers, such as nonoxynol-9; glycerol alkyl esters, such as glyceryl laurate; polyoxyethylene glycol sorbitan alkyl esters, such as polysorbate, sorbitan alkyl esters, cocamide MEA, cocamide DEA, dodecyldimethylamine oxide, block copolymers of polyethylene glycol and polypropylene glycol, such as poloxamers, polyethoxylated tallow amine (POEA), and alkyl polyglycosides (APGs).

Examples of cationic surfactants that can be used in the viscosity reducer compositions of the present disclosure include, but are not limited to, octenidine dihydrochloride, cetrimonium bromide (CTAB), cetylpyridinium chloride (CPC), benzalkonium chloride (BAC), benzethonium chloride (BZT), dimethyldioctadecylammonium chloride, and dioctadecyldimethylammonium bromide (DODAB).

In some embodiments, the one or more surfactants is selected from the group consisting of an alkyl polyglycoside (APG), hexadecyl trimethyl ammonium bromide (CTAB), tetradecyl trimethyl ammonium bromide (TTAB), dodecyl trimethyl ammonium bromide (DTAB), dodecyl trimethyl ammonium chloride (DTAC), tetradecyl trimethyl ammonium chloride (TTAC), hexadecyl trimethyl ammonium chloride (CTAC), and combinations thereof. In some embodiments, the one or more surfactants comprise an alkyl polyglycoside (APG), hexadecyl trimethyl ammonium bromide (CTAB), tetradecyl trimethyl ammonium bromide (TTAB), dodecyl trimethyl ammonium bromide (DTAB), dodecyl trimethyl ammonium chloride (DTAC), tetradecyl trimethyl ammonium chloride (TTAC), hexadecyl trimethyl ammonium chloride (CTAC), or combinations thereof. In some embodiments, the one or more surfactants is selected from the group consisting of alkyl polyglycosides, hexadecyl trimethyl ammonium bromide, and combinations thereof. In some embodiments, the alkyl polyglycoside may comprise a hydrophobic portion comprising ($C_{12}$-$C_{14}$) alkyl chains, and a hydrophilic portion comprising from 1 to 3 glucose structures.

In some embodiments, the viscosity reducer composition may comprise from 0.01 wt. % to 5 wt. % surfactants based on the total weight of the viscosity reducer composition. In some embodiments, the viscosity reducer composition may comprise from 0.01 wt. % to 5 wt. %, from 0.01 wt. % to 4 wt. %, from 0.01 wt. % to 3 wt. %, from 0.01 wt. % to 2 wt. %, from 0.01 wt. % to 1 wt. %, from 0.01 wt. % to 0.5 wt. %, from 0.01 wt. % to 0.1 wt. %, from 0.1 wt. % to 5 wt. %, from 0.1 wt. % to 4 wt. %, from 0.1 wt. % to 3 wt. %, from 0.1 wt. % to 2 wt. %, from 0.1 wt. % to 1 wt. %, from 0.1 wt. % to 0.5 wt. %, from 0.2 wt. % to 5 wt. %, from 0.2 wt. % to 4 wt. %, from 0.2 wt. % to 3 wt. %, from 0.2 wt. % to 2 wt. %, from 0.2 wt. % to 1 wt. %, or from 0.2 wt. % to 0.5 wt. % of the one or more surfactants based on the total weight of the viscosity reducer composition.

Without being bound by any particular theory, it is believed that a non-ionic surfactant in the viscosity reducer composition may be an interfacial active agent, which may decrease the interfacial tension (IFT) between oil and water. Further, it is believed that the reduction of the IFT between oil and water may cause the oil to form small oil droplets that are more easily displaced. Additionally, it is believed that a low IFT may contribute to the dispersion of oil across the water phase, which may lead to the formation of an oil-in-water (O/W) type emulsion which may have a lower viscosity than a water-in-oil (W/O) type emulsion. Additionally, it is believed that in some embodiments, the non-ionic surfactant may not exhibit a cloud point at high temperature and high salinity. As used herein, the term "cloud point" may refer to the temperature at which non-ionic surfactants become separated from the solution.

Without being bound by any particular theory, it is believed that a cationic surfactant in the viscosity reducer composition may be an emulsifier, which may favor the formation of an O/W type emulsion, which may have a lower viscosity than a W/O type emulsion.

In some embodiments, the viscosity reducer composition comprises an aqueous solution.

In some embodiments, the aqueous solution may comprise one or more of deionized, tap, distilled, or fresh waters; natural, brackish, or saturated salt waters; natural, salt dome, hydrocarbon formation produced, or synthetic brines; filtered or untreated seawaters; mineral waters; or other potable or non-potable waters containing one or more dissolved salts, minerals, or organic materials. In one or more embodiments, the aqueous solution may comprise at least 80 wt. %, at least 90 wt. %, at least 95 wt. %, at least 99 wt. %, or even at least 99.9 wt. % of water.

In some embodiments, at least 90 wt. %, at least 95 wt. %, or even at least 99 wt. % of the aqueous solution by mass may be a brine solution. As used herein, the term "brine" may refer to a saturated solution of one or more alkali metal chlorides. For example, "brine" may refer to a saturated solution of NaCl, KCl, or mixtures thereof. Alternatively, the term "brine" may refer to naturally derived saltwater, for example, seawater or salt lake water, used in its natural state or after having undergone processing, such as filtration, to remove contaminants and large particles. In one or more embodiments, the aqueous solution may consist of brine.

In some embodiments, the aqueous solution may comprise a concentration of total dissolved solids from 1,000 parts per million (ppm) to 60,000 ppm. In some embodiments, the aqueous solution may comprise a concentration of total dissolved solids from 1,000 ppm to 60,000 ppm, from 10,000 ppm to 60,000 ppm, from 20,000 ppm to 60,000 ppm, from 30,000 ppm to 60,000 ppm, from 40,000 ppm to 60,000 ppm, or from 50,000 ppm to 60,000 ppm.

In some embodiments, the viscosity reducer composition may be combined with crude oil, which may reduce the viscosity of the crude. In some embodiments the crude oil comprises dry gas, wet gas, light oil, heavy oil, or combinations thereof. As used herein, "dry gas" may comprise hydrocarbons with one carbon atom. As used herein, "wet gas" may comprise hydrocarbons with between two carbon atoms and five carbon atoms. As used herein, "light oil" may comprise hydrocarbons with between six carbon atoms and fourteen carbon atoms. As used herein, "heavy oil" may comprise hydrocarbons with fifteen or greater carbon atoms.

In some embodiments, the viscosity reducer composition may be stable at high temperatures and high salinity environments. For instance, the viscosity reducer composition may be stable at temperatures up to 100° C., up to 90° C., or up to 50° C. In some embodiments, the viscosity reducer composition may be stable in an aqueous solution with a concentration of up to 100,000 ppm, up to 90,000 ppm, up to 80,000 ppm, up to 70,000 ppm, or up to 60,000 ppm of total dissolved solids.

In some embodiments, the viscosity reducer compositions may form a stable emulsion when combined with heavy oil. In some embodiments, the emulsion is an oil-in-water emulsion. Without being bound by any particular theory, it is believed that a stable oil-in-water emulsion will contribute to the viscosity reduction of crude oil. In some embodiments, the emulsion comprising the viscosity reducer composition and heavy oil may demulsify over time, which may cause separation of the oil from the viscosity reducer composition.

In some embodiments, a method of producing a viscosity reducer composition comprises attaching covalently one or more polymers to one or more polyaromatic hydrocarbons, thus producing a polymer modified with polyaromatic hydrocarbons; combining the polymer modified with polyaromatic hydrocarbons with one or more rheology modifiers, an aqueous solution, and one or more polycyclic compounds, to form a suspended solution precursor, wherein the one or more polycyclic compounds is selected from the group consisting of the compound of formula (1), the compound of formula (2), the compound of formula (3), the compound of formula (4), and the compound of formula (5), as those are defined above, in which $R_1$-$R_{50}$ are each independently H, $(C_1$-$C_{20})$hydrocarbyl, $(C_1$-$C_{20})$heterohydrocarbyl, $(C_1$-$C_{20})$carbonyl, or $(C_1$-$C_{20})$hydroxyl; stirring the solution precursor to form a suspended solution; adding one or more surfactants to the suspended solution to form a viscosity reducer composition precursor; and stirring the viscosity reducer composition precursor to form a viscosity reducer composition.

In some embodiments, the one or more polymers consist of poly(ethylene glycol). In some embodiments, the one or more polymers may comprise poly(ethylene glycol). In some embodiments, the one more polymers may comprise polyethylene. In some embodiments, the one or more polymers may be water-soluble polymers, including but not limited to polyacrylamide, polyacrylic acid, cellulose, polymaleic anhydride, and polyvinylpyrrolidone.

In some embodiments, pyrene and naphthalene are covalently attached to one or more polymers. In some embodiments, pyrene and naphthalene are covalently attached to poly(ethylene glycol) (PEG) to form pyrenyl-poly(ethylene glycol) (Py-PEG) and naphthyl-poly(ethylene glycol) (Np-PEG), respectively. In some embodiments, the method of producing the viscosity reducer composition may comprise Py-PEG, Np-PEG, or combinations thereof.

In some embodiments, the method may comprise one or more polycyclic compounds selected from the group consisting of pyrene, methylpyrene, benzo[α]pyrene, pyrenemethanol, pyrenebutanol, pyrenebutyric acid, naphthalene, anthracene, phenanthrene, methylnaphthalene, naphthalenemethanol, and combinations thereof.

In some embodiments, the method may comprise one or more polycyclic compounds comprising pyrene, methylpyrene, benzo[α]pyrene, pyrenemethanol, pyrenebutanol, pyrenebutyric acid, naphthalene, anthracene, phenanthrene, methylnaphthalene, naphthalenemethanol, or combinations thereof.

In some embodiments, the method may comprise an aqueous solution having a concentration of total dissolved solids from 1,000 parts per million (ppm) to 60,000 ppm. In some embodiments, the aqueous solution may comprise a concentration of total dissolved solids from 1,000 ppm to 60,000 ppm, from 10,000 ppm to 60,000 ppm, from 20,000 ppm to 60,000 ppm, from 30,000 ppm to 60,000 ppm, from 40,000 ppm to 60,000 ppm, or from 50,000 ppm to 60,000 ppm.

In some embodiments, the method described herein can be used to produce any embodiment of the viscosity reducer composition described herein.

In some embodiments, a method of reducing the viscosity of crude oil is described. The method comprises forming a viscosity reducer composition, wherein the viscosity reducer composition comprises one or more polycyclic compounds, one or more polymers covalently attached to one or more polyaromatic compounds, one or more rheology modifiers, one or more surfactants, and an aqueous solution; wherein the one or more polycyclic compounds are selected from the group consisting of the compound of formula (1), the compound of formula (2), the compound of formula (3), the compound of formula (4), and the compound of formula (5), as those are defined above, in which $R_1$-$R_{50}$ are each independently H, $(C_1$-$C_{20})$hydrocarbyl, $(C_1$-$C_{20})$heterohydrocarbyl, $(C_1$-$C_{20})$carbonyl, or $(C_1$-$C_{20})$hydroxyl; and combining the viscosity reducer composition and crude oil to form an emulsion, wherein the emulsion has a volume ratio of the crude oil to the viscosity reducer composition from 50:50 to 90:10, thereby reducing the viscosity of the crude oil.

In some embodiments, the crude oil is light oil, heavy oil, or combinations thereof. In some embodiments, the crude oil is heated before combining with the viscosity reducer composition. In some embodiments, the viscosity reducer composition is heated before combining with the crude oil. In some embodiments, the viscosity reducer composition and crude oil are combined and then heated together. In some embodiments, the viscosity reducer composition and crude oil are heated independently and then combined.

In some embodiments, the crude oil and viscosity reducer composition are combined at a volume ratio of the crude oil to the viscosity reducer composition from 50:50 to 90:10. For example, the volume ratio of the crude oil to the viscosity reducer composition may be from 50:50 to 90:10, from 50:50 to 80:20 from 50:50 to 70:30 from 50:50 to 60:40, from 60:40 to 90:10, from 60:40 to 80:20 from 60:40 to 70:30 from 70:30 to 90:10, from 70:30 to 80:20, or from 80:20 to 90:10.

Without being bound by any particular theory, it is believed that the ratio of the crude oil to the viscosity reducer composition of the emulsion is related to the viscosity of the emulsion. For example, as the ratio is reduced the emulsion contains an increased amount of the viscosity reducer composition relative to the oil, and the viscosity of the emulsion may be reduced.

Without being bound by any particular theory, it is believed that the reduction of the viscosity of heavy oil within a formation may result in a greater amount of heavy oil lifted to the surface which may improve the productivity and recovery from heavy oil resources.

While some embodiments herein are directed towards the viscosity reduction of heavy oil, it is understood that all embodiments described herein could also be used with crude oil, light oil, heavy oil, or combinations thereof.

Advantages of some embodiments disclosed herein may include, but are not limited to, viscosity reducer compositions stable in high-temperature and high-salinity environments, strong emulsification and efficient demulsification with heavy oil, and pronounced effectiveness in the viscosity reduction of heavy oil, thereby, improving the efficiency of heavy oil production.

According to an aspect, either alone or in combination with any other aspect, a viscosity reducer composition includes one or more polycyclic compounds, one or more polymers covalently attached to one or more polyaromatic compounds, one or more rheology modifiers, one or more surfactants, and an aqueous solution. The one or more polycyclic compounds are selected from the group consisting of a compound of formula (1), a compound of formula (2), a compound of formula (3), a compound of formula (4), and a compound of formula (5):

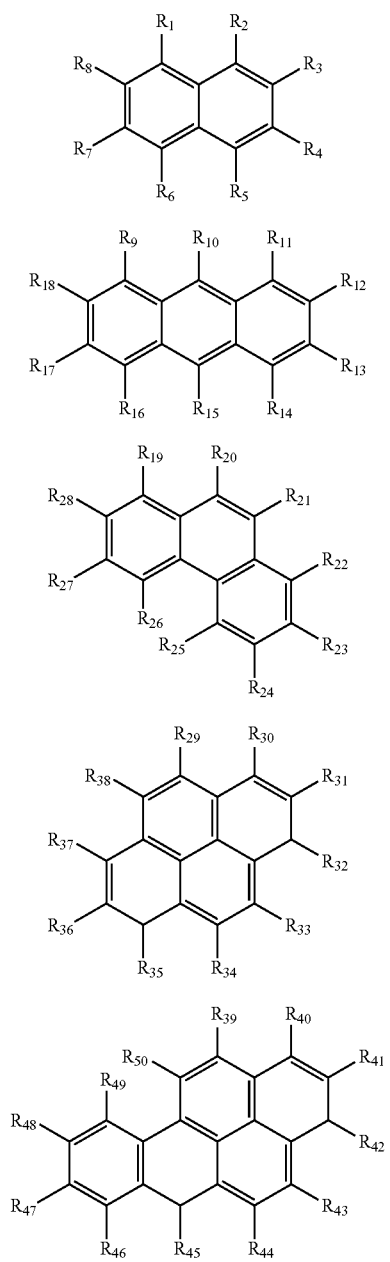

in which $R_1$-$R_{50}$ are each independently H, $(C_1$-$C_{20})$ hydrocarbyl, $(C_1$-$C_{20})$heterohydrocarbyl, $(C_1$-$C_{20})$carbonyl, or $(C_1$-$C_{20})$hydroxyl.

According to a second aspect, either alone or in combination with any other aspect, the one or more polycyclic compounds is selected from the group consisting of pyrene, methylpyrene, benzo[α]pyrene, pyrenemethanol, pyrenebutanol, pyrenebutyric acid, naphthalene, anthracene, phenanthrene, methylnaphthalene, naphthalenemethanol, and combinations thereof.

According to a third aspect, either alone or in combination with any other aspect, the one or more polyaromatic compounds is selected from the group consisting of pyrenyl groups, naphthyl groups, and combinations thereof.

According to a fourth aspect, either alone or in combination with any other aspect, the one or more polymers comprise poly(ethylene glycol).

According to a fifth aspect, either alone or in combination with any other aspect, the one or more rheology modifiers is selected from the group consisting of poly(ethylene oxide), xanthan gum, soluble starch, sodium methylcellulose, and combinations thereof.

According to a sixth aspect, either alone or in combination with any other aspect, the one or more surfactants comprise at least a non-ionic surfactant and a cationic surfactant.

According to a seventh aspect, either alone or in combination with any other aspect, the one or more surfactants is selected from the group consisting of an alkyl polyglycosides (APG), hexadecyl trimethyl ammonium bromide (CTAB), tetradecyl trimethyl ammonium bromide (TTAB), dodecyl trimethyl ammonium bromide (DTAB), dodecyl trimethyl ammonium chloride (DTAC), tetradecyl trimethyl ammonium chloride (TTAC), hexadecyl trimethyl ammonium chloride (CTAC), and combinations thereof.

According to an eighth aspect, either alone or in combination with any other aspect, the one or more surfactants is selected from the group consisting of an alkyl polyglycoside, hexadecyl trimethyl ammonium bromide, and combinations thereof.

According to a ninth aspect, either alone or in combination with any other aspect, the aqueous solution comprises a concentration of total dissolved solids from 40,000 parts per million to 60,000 parts per million.

According to a tenth aspect, either alone or in combination with any other aspect, the viscosity reducer composition comprises from 0.01 weight percent to 1 weight percent of the one or more polycyclic compounds based on the total weight of the viscosity reducer composition.

According to an eleventh aspect, either alone or in combination with any other aspect, the viscosity reducer composition comprises from 0.1 weight percent to 1 weight percent of the one or more polymers covalently attached to one or more polyaromatic compounds based on the total weight of the viscosity reducer composition.

According to a twelfth aspect, either alone or in combination with any other aspect, the viscosity reducer composition comprises from 0.01 weight percent to 1 weight percent of the one or more rheology modifiers based on the total weight of the viscosity reducer composition.

According to a thirteenth aspect, either alone or in combination with any other aspect, the viscosity reducer composition comprises from 0.01 weight percent to 2 weight percent of the one or more surfactants based on the total weight of the viscosity reducer composition.

According to a fourteenth aspect, either alone or in combination with any other aspect, the viscosity reducer composition includes from 0.1 weight percent to 0.6 weight percent of the one or more polycyclic compounds, from 0.1 weight percent to 0.4 weight percent of the one or more polymers covalently attached to one or more polyaromatic compounds from 0.04 weight percent to 0.06 weight percent of the one or more rheology modifiers, and from 0.01 weight percent to 1 weight percent of the one or more surfactants. The one or more polymers is selected from the group consisting of pyrenyl-poly(ethylene glycol), naphthyl-poly(ethylene glycol), and combinations thereof. The one or more rheology modifiers comprises poly(ethylene oxide). The one or more surfactants comprises an alkyl polyglycoside and a cationic surfactant.

According to a fifteenth aspect, either alone or in combination with any other aspect, a method of producing a viscosity reducer composition including attaching covalently one or more polymers to one or more polyaromatic hydrocarbons, thus producing a polymer modified with polyaromatic hydrocarbons, combining the polymer modified with polyaromatic hydrocarbons with one or more rheology modifiers, an aqueous solution, and one or more polycyclic compounds, to form a suspended solution precursor, stirring the suspended solution precursor to form a suspended solution, adding one or more surfactants to the suspended solution to form a viscosity reducer composition precursor, and stirring the viscosity reducer composition precursor to form a viscosity reducer composition. the one or more polycyclic compounds is selected from the group consisting of a compound of formula (1), a compound of formula (2), a compound of formula (3), a compound of formula (4), and a compound of formula (5):

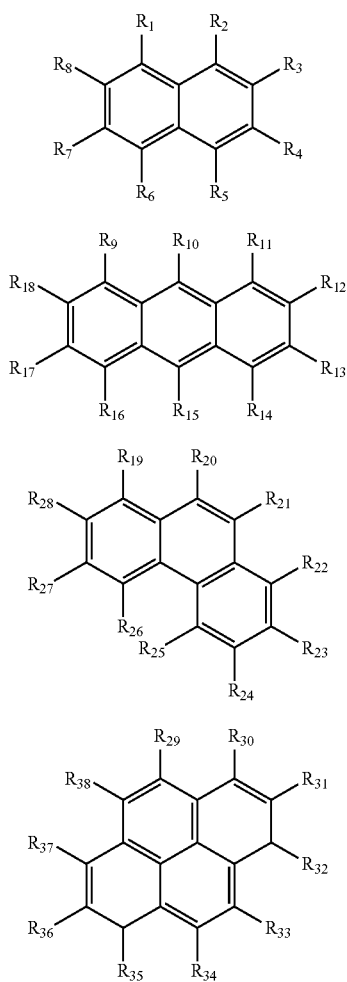

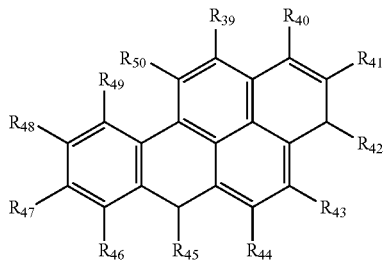

in which $R_1$-$R_{50}$ are each independently H, $(C_1$-$C_{20})$hydrocarbyl, $(C_1$-$C_{20})$heterohydrocarbyl, $(C_1$-$C_{20})$carbonyl, or $(C_1$-$C_{20})$hydroxyl.

According to a sixteenth aspect, either alone or in combination with any other aspect, the one or more polymers is poly(ethylene glycol).

According to a seventeenth aspect, either alone or in combination with any other aspect, the one or more polyaromatic compounds is selected from the group consisting of pyrenyl groups, naphthyl groups, and combinations thereof.

According to an eighteenth aspect, either alone or in combination with any other aspect, the one or more polycyclic compounds is selected from the group consisting of pyrene, methylpyrene, benzo[α]pyrene, pyrenemethanol, pyrenebutanol, pyrenebutyric acid, naphthalene, anthracene, phenanthrene, methylnaphthalene, naphthalenemethanol, and combinations thereof.

According to a nineteenth aspect, either alone or in combination with any other aspect, the aqueous solution has a concentration of total dissolved solids of from 40,000 parts per million to 60,000 parts per million.

According to a twentieth aspect, either alone or in combination with any other aspect, the one or more surfactants comprise at least a non-ionic surfactant and a cationic surfactant.

According to a twenty first aspect, either alone or in combination with any other aspect, a method of reducing the viscosity of heavy oil includes forming a viscosity reducer composition and combining the viscosity reducer composition and crude oil to form an emulsion. The viscosity reducer composition includes one or more polycyclic compounds, one or more polymers covalently attached to one or more polyaromatic compounds, one or more rheology modifiers, one or more surfactants, and an aqueous solution. The one or more polycyclic compounds are selected from the group consisting of a compound of formula (1), a compound of formula (2), a compound of formula (3), a compound of formula (4), and a compound of formula (5):

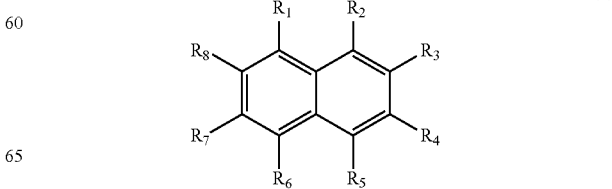

-continued

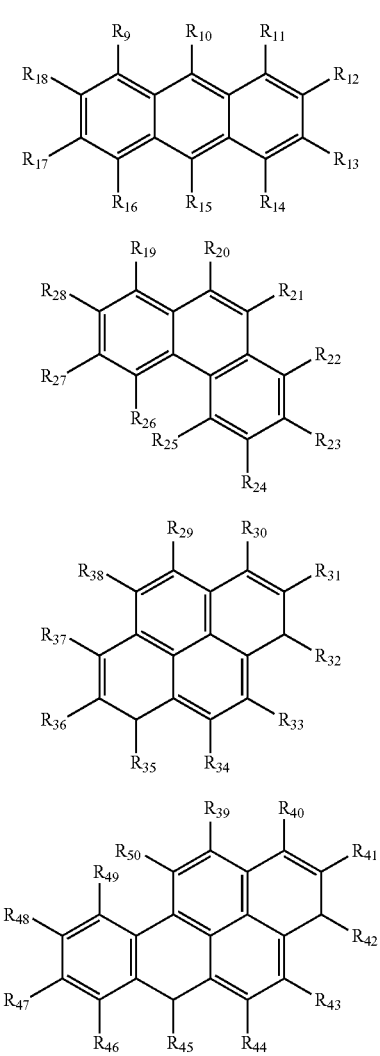

in which $R_1$-$R_{50}$ are each independently H, $(C_1$-$C_{20})$hydrocarbyl, $(C_1$-$C_{20})$heterohydrocarbyl, $(C_1$-$C_{20})$carbonyl, or $(C_1$-$C_{20})$hydroxyl. The emulsion has a volume ratio of the crude oil to the viscosity reducer composition from 50:50 to 90:10, thereby reducing the viscosity of the crude oil.

EXAMPLES

The various embodiments disclosed herein will be further clarified by the following examples. The examples are illustrative in nature, and should not be understood to limit the embodiments disclosed herein.

Example 1. Synthesis of Py-PEG and Np-PEG

Pyrene and naphthalene are covalently attached to poly (ethylene glycol) (PEG) to form pyrenyl-poly(ethylene glycol) (Py-PEG) and naphthyl-poly(ethylene glycol) (Np-PEG), respectively. Specifically, the hydroxyl ends of PEG are reacted with p-toluenesulfonyl chloride (TsCl) in dichloromethane (DCM) in the presence of trimethylamine (TEA) to yield PEG-Ts. In a round-bottom flask, the PEG polymer with a molecular weight of 2,000 g/mol is dissolved into freshly distilled DCM. The solution is kept under nitrogen. TEA (5-fold excess of PEG) is added to the solution after the dissolution of PEG is complete. The flask is immersed in an ice bath and the mixture is stirred for approximately 10 min. TsCl (3-fold molar excess of PEG) is added dropwise. After a homogeneous mixture is visually observed, the ice bath is removed and the reaction is allowed to warm to room temperature and left to stir overnight under a nitrogen environment. After 12 hours, the mixture is concentrated under vacuum and added dropwise to a petroleum ether, where the volume of petroleum ether is 10-fold the volume of the concentrated mixture, forming a white precipitate. The white precipitate (identified as PEG-Ts) is filtered and dried in a vacuum oven at room temperature. The dry PEG-Ts is ground into powder and suspended in toluene. The impurities, including triethylamine hydrochloride and TsCl residues, are filtered off and the filtrate is rotary evaporated and added dropwise to a large amount of petroleum ether. The resulting white precipitate is collected by filtration and dried under vacuum to yield the purified intermediate product PEG-Ts in a yield of approximately 90%.

In a second step, the toluenesulfonyl groups of PEG-Ts are replaced by an excess of sodium pyrenemethoxide or sodium naphthalenemethoxide, in which sodium pyrenemethoxide or sodium naphthalenemethoxide are formed by reacting pyrene-methanol or naphthalene-methanol, respectively, with sodium hydride (NaH) in N,N-dimethylformamide (DMF) to obtain the PEG construct as Ar-PEG, where Ar is Py or Np. Specifically, purified pyrene- or naphthalene-methanol (6-fold excess of PEG-Ts) via recrystallization from ethyl acetate-hexane mixture is dissolved into freshly distilled DMF in a round-bottom flask. The flask is flamed beforehand three times under vacuum to completely remove any moisture and it is kept under a nitrogen atmosphere. Sodium hydride (5-fold excess of PEG-Ts) is added and the mixture is stirred at room temperature until a black solution is obtained. PEG-Ts is added to the reaction flask, which is then placed in an oil bath at 60° C. and stirred overnight under nitrogen. The oil bath is removed and the mixture is cooled to room temperature after quenching the reaction with a droplet of water. To purify the obtained Ar-PEG, the obtained product in DMF is highly concentrated and dissolved in methanol, then placed in a fridge at 0° C. for several hours to precipitate the product. The mixture is centrifuged at 0° C., the supernatant is discarded and the precipitate is dissolved in methane once more to repeat the process of purification. The purified product is obtained by precipitation in petroleum ether and dried under vacuum at room temperature. The yield of the final products is between 70% and 80%. The reaction scheme of the synthetic route that is followed to prepare Py-PEG or Np-PEG as discussed above is illustrated in FIG. 1.

Additionally, the Py-PEG and Np-PEG products are characterized using proton nuclear magnetic resonance ($^1$H NMR) characterization.

Figure 2:
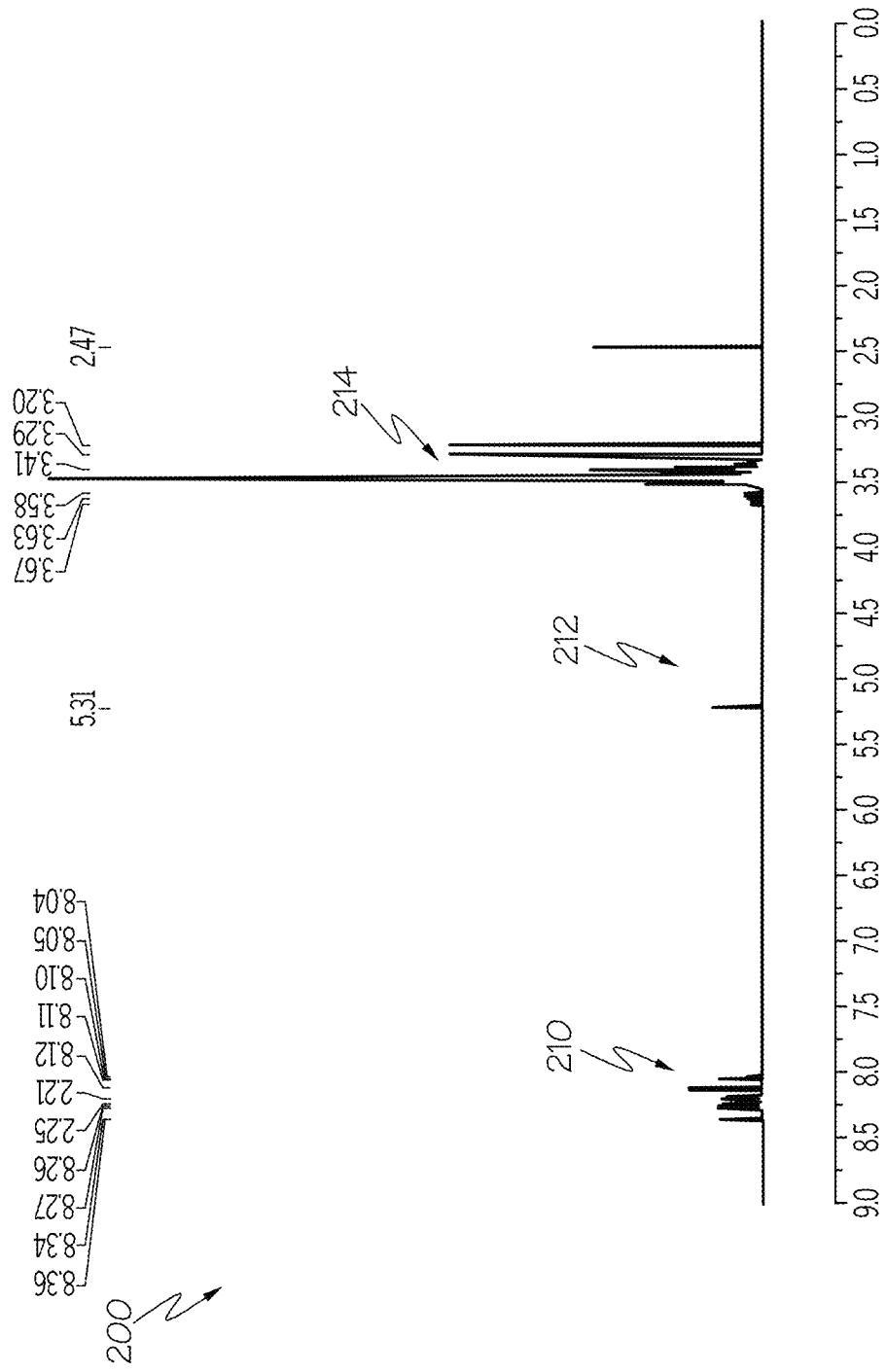
FIG. 2 is a graphical representation of NMR characterization, according to one or more embodiments described herein.

FIG. 2 shows the $^1$H NMR spectrum of Py-PEG in DMSO-$d_6$ 200. The peaks between 8.0 and 8.5 ppm 210 characterize the protons of the aromatic rings of pyrene. The peak (doublet) at 5.2 ppm 212 characterizes the methylene protons of Py-PEG. The peaks between 3.0 ppm and 4.0 ppm 214 characterize the PEG chain.

Figure 3:
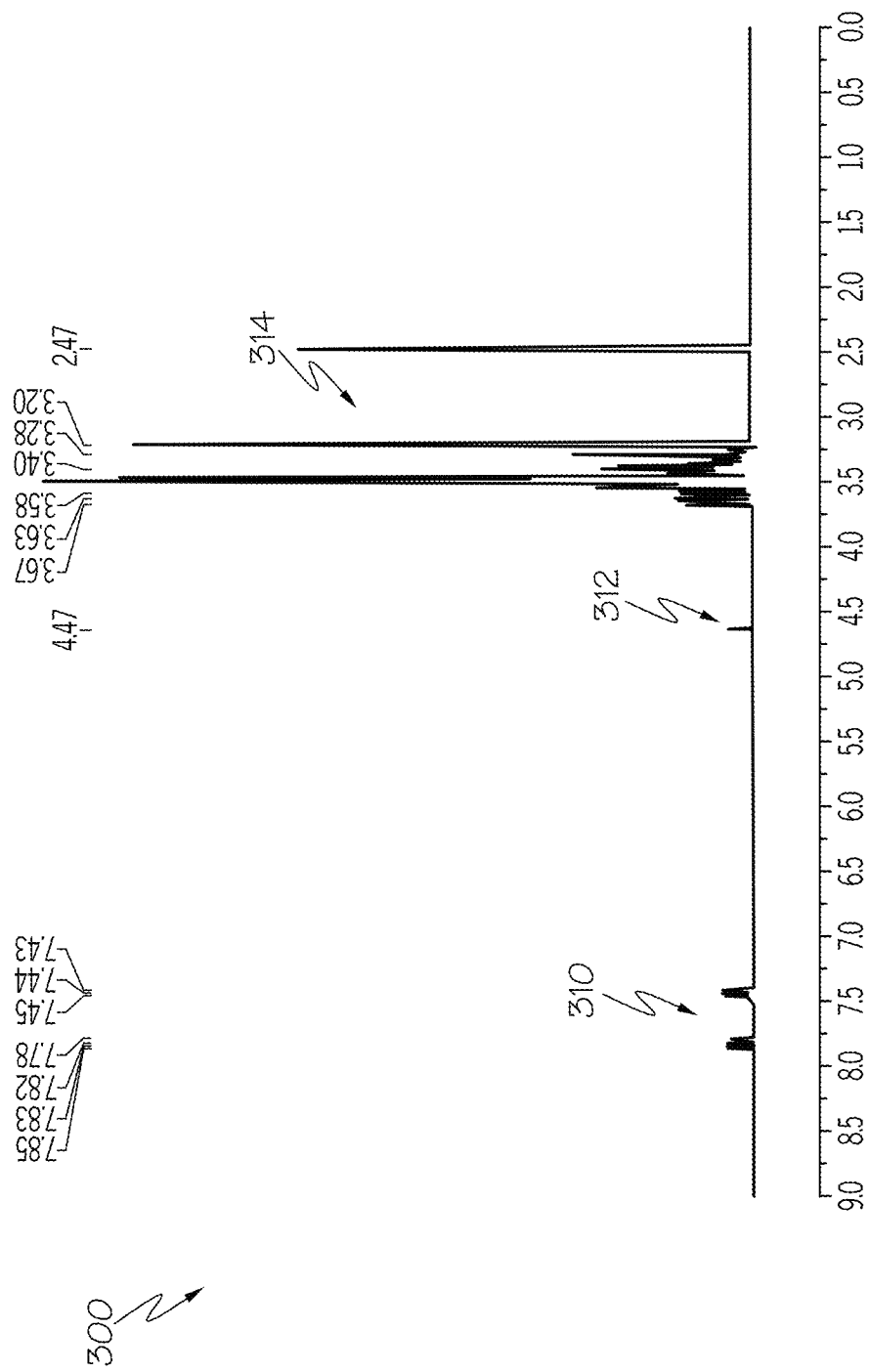
FIG. 3 is a graphical representation of NMR characterization, according to one or more embodiments described herein.

FIG. 3 shows the $^1$H NMR spectrum of Np-PEG in DMSO-$d_6$ 300. The peaks between 7.25 and 8.0 ppm 310 characterize the protons of the aromatic rings of naphthalene. The peak (doublet) at 4.6 ppm 312 characterizes the methylene protons of Np-PEG. The peaks between 3.0 ppm and 4.0 ppm 314 characterize the PEG chain.

Example 2. Viscosity Reducer Compositions

Viscosity reducer compositions are prepared using formulations according to Table 1. Pyrenyl-poly(ethylene glycol) (Py-PEG), naphthyl-poly(ethylene glycol) (Np-PEG), pyrene, naphthalene, and poly(ethylene oxide) (PEO) are dissolved in an aqueous solution of water and the ion concentrations according to Table 2 under vigorous stirring at 25° C. for 2 hours to obtain a suspended solution. An alkyl polyglucoside surfactant (APG) and hexadecyl trimethyl ammonium bromide (CTAB) are added to the suspended solution with continuous stirring for 2 hours, yielding a transparent viscosity reducer solution for heavy oil viscosity reduction. The APG comprises a hydrophobic portion comprising ($C_{12}$-$C_{14}$) alkyl chains and a hydrophilic portion comprising from 1 to 3 glucose structures. The APG formulation is commercially available as APG1214, which is manufactured by Yixing Jinlan Chemical Engineering Co. Ltd., Jiangsu Province, China.

TABLE 1

| Example | Py-PEG (mg) | Np-PEG (mg) | Pyrene (mg) | Napthalene (mg) | PEO (mg) | Aqueous solution (mL) | APG (mg) | CTAB (mg) |
|---|---|---|---|---|---|---|---|---|
| 2-1 | 60 | 20 | 4 | 2 | 10 | 20 | 10 | 140 |
| 2-2 | 80 | 40 | 4 | 2 | 10 | 20 | 10 | 160 |
| 2-3 | 80 | 10 | 8 | 2 | 10 | 20 | 10 | 150 |
| 2-4 | 70 | 10 | 6 | 4 | 10 | 20 | 10 | 160 |

TABLE 2

| Ions | Ion amount, ppm |
|---|---|
| $Na^+$ | 18,300 |
| $Ca^{2+}$ | 650 |
| $Mg^{2+}$ | 2,110 |
| $SO_4^{2-}$ | 4,290 |
| $Cl^-$ | 32,200 |
| $CO_3^{2-}$ | 0 |
| $HCO_3^{2-}$ | 120 |
| Total dissolved solids (TDS) | 57,670 |

Example 3. Compatibility and Stability of Viscosity Reducer Compositions

Figure 4:
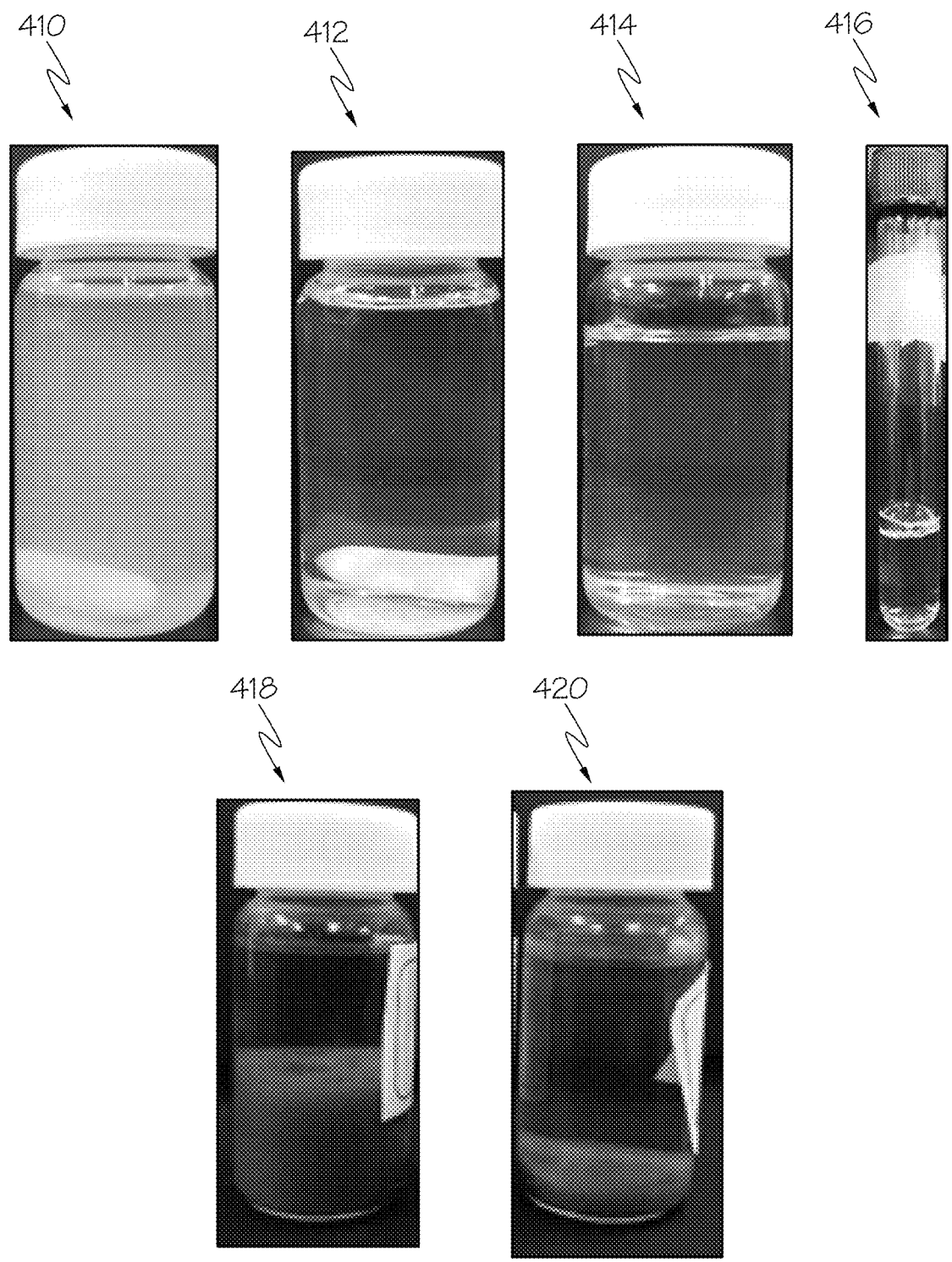
FIG. 4 shows images of a viscosity reducer composition and comparative examples, according to one or more embodiments described herein.

The compatibility and stability of the viscosity reducer composition prepared in Example 2-1 is observed and demonstrated in FIG. 4. Specifically, the one or more polycyclic compounds, the one or more polymers covalently attached to one or more polyaromatic compounds, the one or more rheology modifiers, and the aqueous solution are combined, according to Example 2-1 at 25° C. to form a suspended solution precursor; the suspended solution precursor is stirred to form a suspended solution 410. The insolubility of the suspended solution 410 is visually observed. The one or more surfactants are added to the suspended solution 410 and stirred to form a viscosity reducer composition 412. The solubility of the viscosity reducer composition 412 is visually observed. The viscosity reducer composition 412 is portioned and one portion is aged in an oven at 50° C., and a second portion is aged in an oven at 90° C. to form a first viscosity reducer composition 414 and a second viscosity reducer composition 416, respectively. The solubility of each portion is observed after 24 hours of heating. FIG. 4 shows that any insolubilities observed in the suspended solution 410 are solubilized into surfactant micelles and yielded a viscosity reducer solution that is thermally stable and compatible with the aqueous solution.

For comparison, two commercially available viscosity reducer compositions sold as PS and LHVR, which are manufactured by Xinhe Nanotech Co., Hebei Province, China, are combined with the aqueous solution of the viscosity reducer compositions described hereinabove to form Comparative Example 1 418 and Comparative Example 2 420, respectively. As seen in FIG. 4, Comparative Example 1 418 and Comparative Example 2 420 results in an insoluble mixture.

Figure 5:
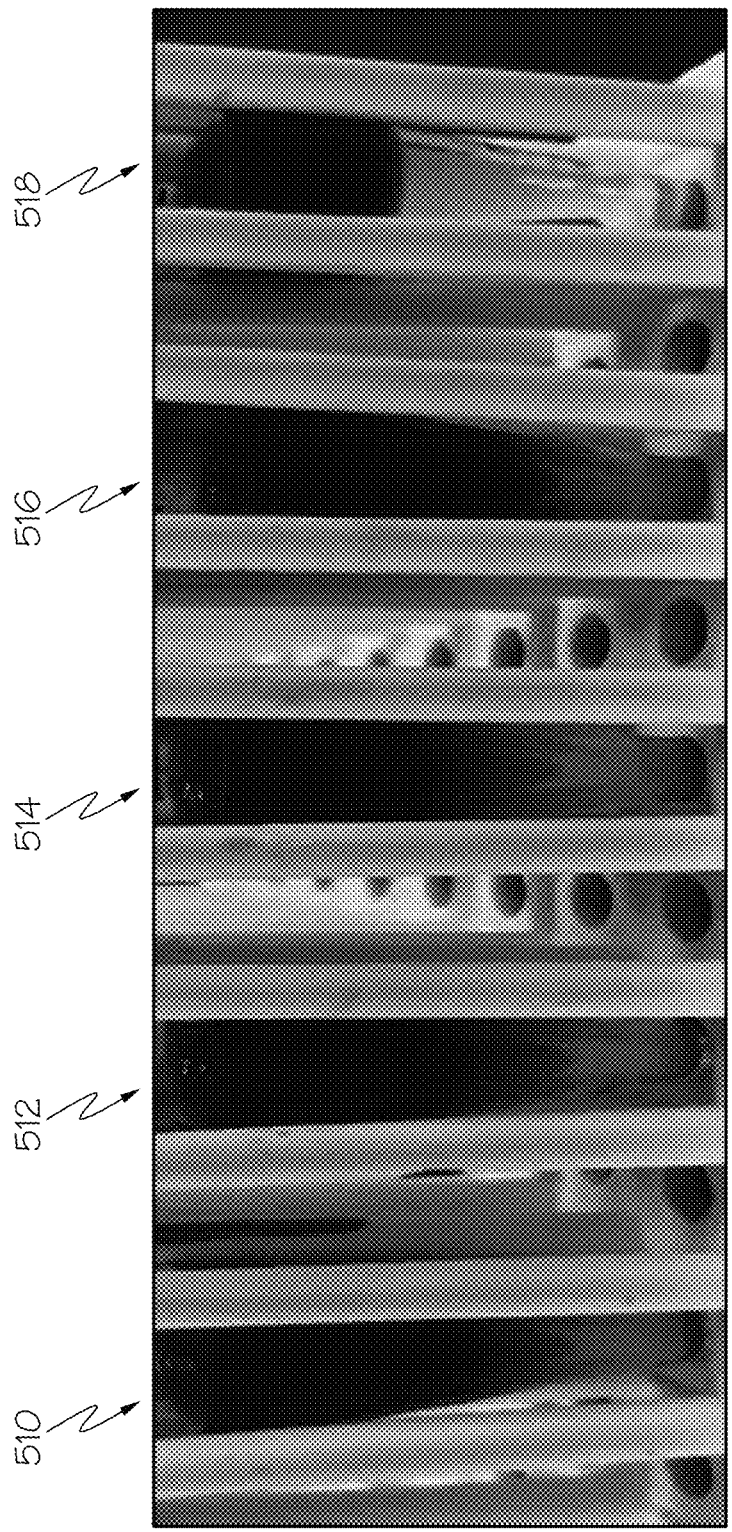
FIG. 5 shows images of viscosity reducer compositions and a comparative example, according to one or more embodiments described herein.
Figure 6:
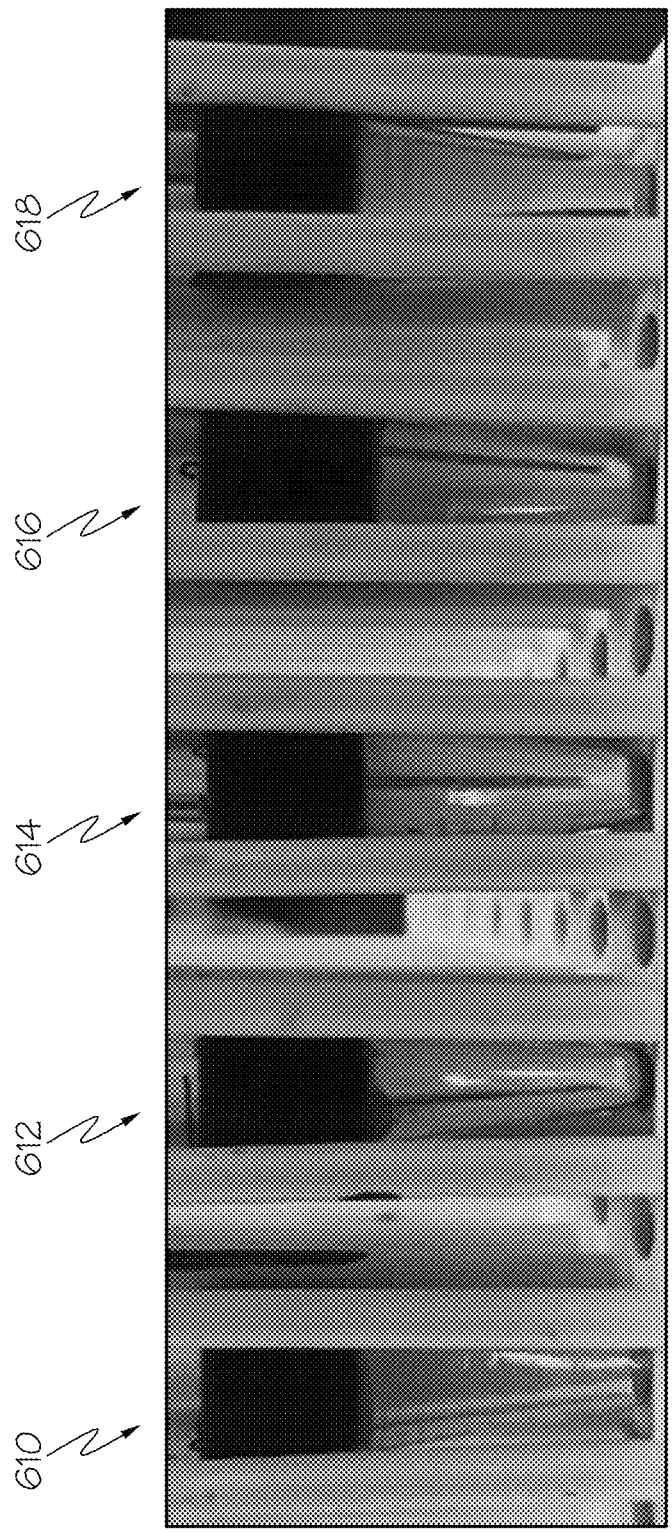
FIG. 6 shows images of viscosity reducer compositions and a comparative example, according to one or more embodiments described herein.

Example 4. Emulsification and Demulsification of Viscosity Reducer Compositions Heavy oil is mixed with the viscosity reducer compositions prepared in Example 2 to form Examples 4-1, 4-2, 4-3, and 4-4, corresponding to heavy oil mixed with Examples 2-1, 2-2, 2-3, 2-4, respectively. Additionally, Comparative Example 4-1 is prepared by mixing heavy oil with aqueous solution, detailed in Example 2, Table 2. The heavy oil and the viscosity reducer compositions are added to centrifuge tubes at an oil-to-water volume ratio of 1:1 and vigorously shaken. The mixtures are placed in an oven at 50° C. The formation of oil-in-water emulsions is visually observed after 10 minutes of heating. The subsequent separation of the emulsions is visually observed after 2 hours. FIG. 5 shows observations after heating Examples 4-1 510, Example 4-2 512, Example 4-3 514, Example 4-4 516, and Comparative Example 4-1 518 for 10 minutes. The results demonstrate that the viscosity reducer compositions prepared in Example 2 form stable emulsions with heavy oil. The oil-water mixtures are then left at 50° C. for 2 hours for observation of demulsification (dehydration of the formed emulsion), demonstrated in FIG. 6. FIG. 6 shows observations after heating Examples 4-1 610, Example 4-2 612, Example 4-3 614, Example 4-4 616, and Comparative Example 4-1 618 for 2 hours and indicates that the emulsions prepared containing the viscosity reducer compositions described in Example 2 exhibit good performance in demulsification with separation after natural gravity settling.

Example 5 Viscosity Reduction of Heavy Crude Oil Using Viscosity Reducer Compositions The viscosity reduction of heavy crude oil using viscosity reducer compositions described herein is measured. The viscosity of the oil-in-water emulsions is determined at 50° C. using a TA controlled-stress rheometer (TA Instruments-Waters LLC) equipped with a setup of double wall concentric cylinders. The shear rate ranges from 0.1 to 100 $s^{-1}$, the viscosity value at shear rate of 6.81 $s^{-1}$ is considered to be the representative viscosity of the emulsion. Before the measurement, a shear rate of 1000 $s^{-1}$ is applied to the sample solution and at 50° C. to avoid partial dehydration of the oil-in-water emulsion. Oil-in-water emulsions are prepared and the viscosity reduction rate ($f_{VR}$) is determined as $$f_{VR} = \frac{\eta_0 - \eta_e}{\eta_0} \times 100\%$$

where $n_0$ and $n_e$ represent the viscosities of the heavy crude oil (dehydrated and degassed) and the oil-in-water emulsion, respectively. The viscosity of the heavy crude oil sample at 50° C. without the addition of a viscosity reducer composition is 552 millipascal seconds (mPa*s). The viscosity reducer compositions of Example 2 are mixed with heavy oil at an oil-to water ratio according to Table 3 to form emulsions. The viscosity of the emulsions is measured according to the viscosity measurement test methods described hereinabove. The measured viscosity for each emulsion and the viscosity reduction rate is reported in Table 3 and demonstrates significant viscosity reduction using embodiments described herein.

TABLE 3

| Example | Viscosity Reducer Composition | Oil-to-water ratio (volume) | Viscosity of emulsion (mPa * s) | Viscosity reduction rate (%) |
| --- | --- | --- | --- | --- |
| Example 5-1a | Example 2-1 | 70:30 | 175 | 68.3 |
| Example 5-2a | Example 2-2 | 70:30 | 163 | 70.5 |
| Example 5-3a | Example 2-3 | 70:30 | 159 | 71.2 |
| Example 5-4a | Example 2-4 | 70:30 | 165 | 70.1 |
| Example 5-1b | Example 2-1 | 60:40 | 68 | 87.7 |
| Example 5-2b | Example 2-2 | 60:40 | 60 | 89.1 |
| Example 5-3b | Example 2-3 | 60:40 | 57 | 89.7 |
| Example 5-4b | Example 2-4 | 60:40 | 63 | 88.6 |

Figure 7:
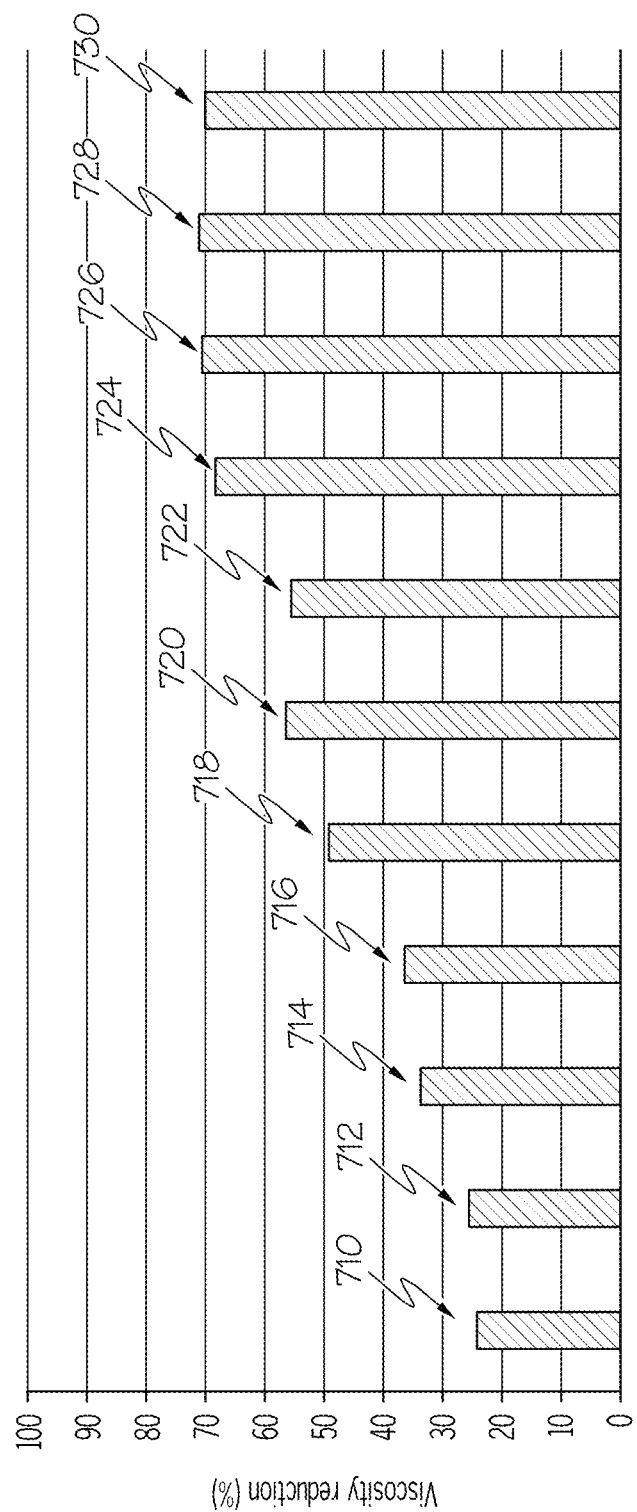
FIG. 7 is a graphical representation of viscosity reducer compositions and comparative examples, according to one or more embodiments described herein.

For comparison, six commercially available viscosity reducer compositions are prepared under the same conditions with an oil-to-aqueous solution ratio of 70:30, and the viscosity reduction rate is measured. Additionally, a control sample includes a 70:30 ratio of oil to aqueous solution, as described in Example 2, Table 2. FIG. 7 is directed to the graph 700 depicting the viscosity reduction rate of the aqueous solution 710, Comparative Example 5-1 712, Comparative Example 5-2, 714, Comparative Example 5-3 716, Comparative Example 5-4 718, Comparative Example 5-5 720, Comparative Example 5-6 722, Example 5-1a 724, Example 5-2a 726, Example 5-3a 728, and Example 5-4a 730 as measured according to the methods described hereinabove. As seen in the graph 700, the Examples disclosed herein demonstrate greater viscosity reduction of heavy oil compared to the comparative examples. The comparative viscosity reducer compositions used in Comparative Example 5-1 712, Comparative Example 5-2, 714, Comparative Example 5-3 716 are commercially available as BY-C, BY-G, and BY-Z, respectively, which are manufactured by Dongying Baiyang Petro Tech. Co., Shandong Province, China. The comparative viscosity reducer compositions used in Comparative Example 5-4 718, Comparative Example 5-5 720, and Comparative Example 5-6 722 are commercially available as N-3507, N-3509, and N-3541, respectively, which are manufactured by Tianjin Xiongguan Tech. Co., Tianjin, China.

Example 6 IFT Measurements of Mixtures of Heavy Crude Oil and Viscosity Reducer Compositions The interfacial tension (IFT) between heavy crude oil and viscosity reducer compositions within an emulsion described herein is measured. Specifically, heavy oil is diluted 1:1 by volume with diesel oil to form diluted heavy oil. The diluted heavy oil is used to determine the IFT between the oil and the aqueous solution of the viscosity reducer composition. All IFT experiments are conducted at 50° C. using a spinning drop tensiometer (Dataphysics SVT 20). Rotational speeds are set to 5,000 min⁻. The diluted heavy oil is mixed with the viscosity reducer compositions of Example 2 to form Examples 6-1, 6-2, 6-3, and 6-4, corresponding to the diluted heavy oil mixed with Examples 2-1, 2-2, 2-3, 2-4, respectively. The measured IFT values in milli-Newtons per meter (mN/m) of Examples 6-1, 6-2, 6-3, and 6-4 are reported in Table 4. Additionally, comparative Example 6-1 is prepared according to the methods of Example 6-1, but the APG is not included in Comparative Example 6-1. The reduction of IFT in the presence of viscosity reducers reflects the tendency of viscosity reducer molecules to diffuse and adsorb onto the continuous and dispersed phases of the emulsions. Low IFT contribute to the dispersion of the oil across the water phase, forming an O/W emulsion and improving the emulsifying performance. The reduction of IFT in the presence of viscosity reducer compositions reflects the tendency of viscosity reducer molecules to diffuse and adsorb onto the continuous and dispersed phases of the emulsions.

TABLE 4

| Example | IFT (mN/m) |
| --- | --- |
| Example 6-1 | 0.046 |
| Example 6-2 | 0.052 |
| Example 6-3 | 0.054 |
| Example 6-4 | 0.050 |
| Comparative Example 6-1 | 0.85 |

It will be apparent to persons of ordinary skill in the art that various modifications and variations can be made without departing from the scope disclosed herein. Since modifications, combinations, sub-combinations, and variations of the disclosed embodiments, which incorporate the spirit and substance disclosed herein, may occur to persons of ordinary skill in the art, the scope disclosed herein should be construed to include everything within the scope of the appended claims and their equivalents.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter disclosed herein has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A viscosity reducer composition comprising:
one or more polycyclic compounds selected from the group consisting of a compound of formula (1), a compound of formula (2), a compound of formula (3), a compound of formula (4), and a compound of formula (5):

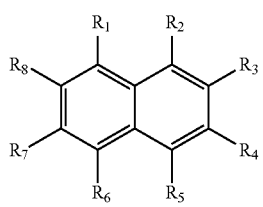

(1)

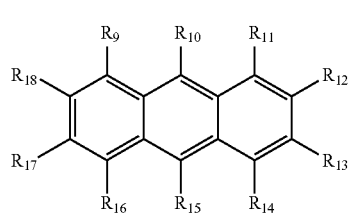

(2)

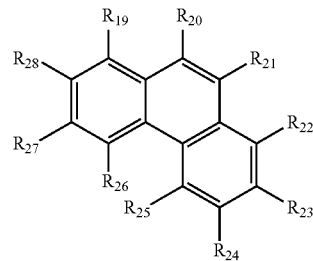

(3)

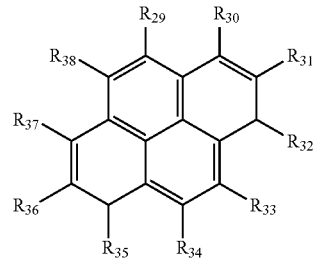

(4)

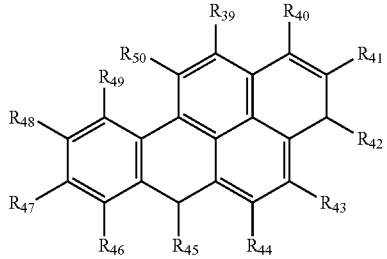

(5)

in which $R_1$-$R_{50}$ are each independently H, $(C_1$-$C_{20})$hydrocarbyl, $(C_1$-$C_{20})$heterohydrocarbyl, $(C_1$-$C_{20})$carbonyl, or $(C_1$-$C_{20})$hydroxyl;
one or more polymers covalently attached to one or more polyaromatic compounds, wherein the polymer has repeating units of five or greater;
one or more rheology modifiers;
one or more surfactants; and
an aqueous solution.

2. The composition of claim 1, wherein the one or more polycyclic compounds is selected from the group consisting of pyrene, methylpyrene, benzo[α]pyrene, pyrenemethanol, pyrenebutanol, pyrenebutyric acid, naphthalene, anthracene, phenanthrene, methylnaphthalene, naphthalenemethanol, and combinations thereof.

3. The composition of claim 1, wherein the one or more polyaromatic compounds is selected from the group consisting of pyrenyl groups, naphthyl groups, and combinations thereof.

4. The composition of claim 1, wherein the one or more polymers comprise poly(ethylene glycol).

5. The composition of claim 1, wherein the one or more rheology modifiers is selected from the group consisting of poly(ethylene oxide), xanthan gum, soluble starch, sodium methylcellulose, and combinations thereof.

6. The composition of claim 1, wherein the one or more surfactants comprise at least a non-ionic surfactant and a cationic surfactant.

7. The composition of claim 1, wherein the one or more surfactants is selected from the group consisting of an alkyl polyglycosides (APG), hexadecyl trimethyl ammonium bromide (CTAB), tetradecyl trimethyl ammonium bromide (TTAB), dodecyl trimethyl ammonium bromide (DTAB), dodecyl trimethyl ammonium chloride (DTAC), tetradecyl trimethyl ammonium chloride (TTAC), hexadecyl trimethyl ammonium chloride (CTAC), and combinations thereof.

8. The composition of claim 1, wherein the one or more surfactants is selected from the group consisting of an alkyl polyglycoside, hexadecyl trimethyl ammonium bromide, and combinations thereof.

9. The composition of claim 1, wherein the aqueous solution comprises a concentration of total dissolved solids from 40,000 parts per million to 60,000 parts per million.

10. The composition of claim 1, wherein the viscosity reducer composition comprises from 0.01 weight percent to 1 weight percent of the one or more polycyclic compounds based on the total weight of the viscosity reducer composition.

11. The composition of claim 1, wherein the viscosity reducer composition comprises from 0.1 weight percent to 1 weight percent of the one or more polymers covalently attached to one or more polyaromatic compounds based on the total weight of the viscosity reducer composition.

12. The composition of claim 1, wherein the viscosity reducer composition comprises from 0.01 weight percent to 1 weight percent of the one or more rheology modifiers based on the total weight of the viscosity reducer composition.

13. The composition of claim 1, wherein the viscosity reducer composition comprises from 0.01 weight percent to 2 weight percent of the one or more surfactants based on the total weight of the viscosity reducer composition.

14. The composition of claim 1, wherein the viscosity reducer composition comprises:
   from 0.1 weight percent to 0.6 weight percent of the one or more polycyclic compounds;
   from 0.1 weight percent to 0.4 weight percent of the one or more polymers covalently attached to one or more polyaromatic compounds, wherein the one or more polymers is selected from the group consisting of pyrenyl-poly(ethylene glycol), naphthyl-poly(ethylene glycol), and combinations thereof;
   from 0.04 weight percent to 0.06 weight percent of the one or more rheology modifiers, wherein the one or more rheology modifiers comprises poly(ethylene oxide); and
   from 0.01 weight percent to 1 weight percent of the one or more surfactants, wherein the one or more surfactants comprises an alkyl polyglycoside and a cationic surfactant.

15. A method of producing a viscosity reducer composition, the method comprising:
   attaching covalently one or more polymers to one or more polyaromatic hydrocarbons, thus producing a polymer modified with polyaromatic hydrocarbons, wherein the polymer has repeating units of five or greater;
   combining the polymer modified with polyaromatic hydrocarbons with one or more rheology modifiers, an aqueous solution, and one or more polycyclic compounds, to form a suspended solution precursor, wherein the one or more polycyclic compounds is selected from the group consisting of a compound of formula (1), a compound of formula (2), a compound of formula (3), a compound of formula (4), and a compound of formula (5):

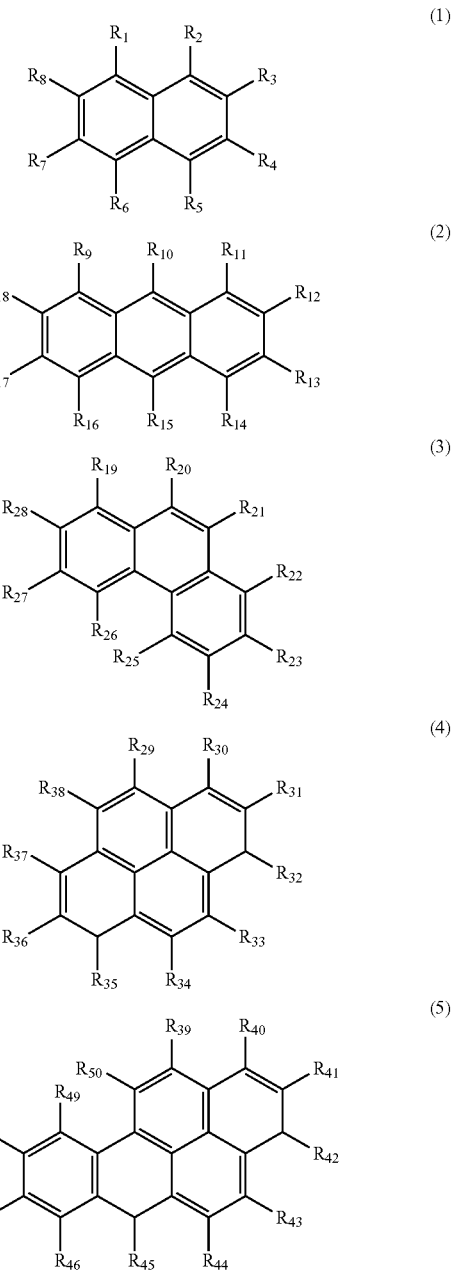

in which $R_1$-$R_{50}$ are each independently H, $(C_1$-$C_{20})$ hydrocarbyl, $(C_1C_{20})$heterohydrocarbyl, $(C_1$-$C_{20})$carbonyl, or $(C_1$-$C_{20})$hydroxyl;
stirring the suspended solution precursor to form a suspended solution;
adding one or more surfactants to the suspended solution to form a viscosity reducer composition precursor; and
stirring the viscosity reducer composition precursor to form a viscosity reducer composition.

16. The method of claim 15, wherein the one or more polymers is poly(ethylene glycol).

17. The method of claim 15, wherein the one or more polyaromatic compounds is selected from the group consisting of pyrenyl groups, naphthyl groups, and combinations thereof.

18. The method of claim 15, wherein the one or more polycyclic compounds is selected from the group consisting of pyrene, methylpyrene, benzo[α]pyrene, pyrenemethanol, pyrenebutanol, pyrenebutyric acid, naphthalene, anthracene, phenanthrene, methylnaphthalene, naphthalenemethanol, and combinations thereof.

19. The method of claim 15, wherein the one or more surfactants comprise at least a non-ionic surfactant and a cationic surfactant.

20. A method of reducing the viscosity of heavy oil comprising:
forming a viscosity reducer composition, wherein the viscosity reducer composition comprises:
one or more polycyclic compounds selected from the group consisting of a compound of formula (1), a compound of formula (2), a compound of formula (3), a compound of formula (4), and a compound of formula (5):

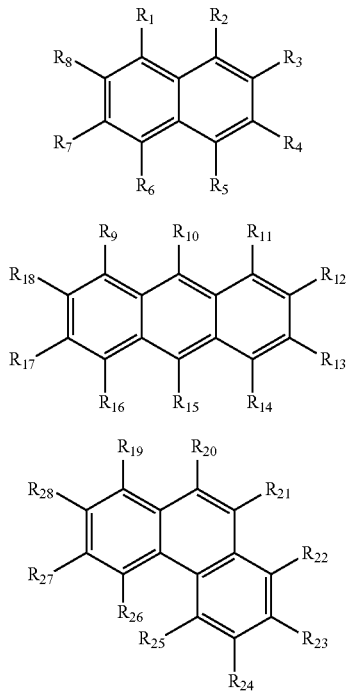

(1)

(2)

(3)

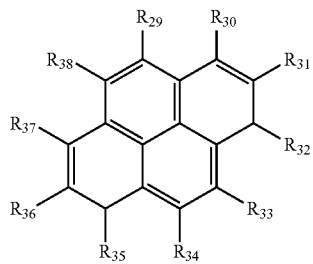

(4)

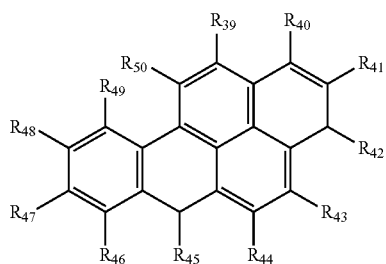

(5)

in which $R_1$-$R_{50}$ are each independently H, $(C_1-C_{20})$hydrocarbyl, $(C_1-C_{20})$heterohydrocarbyl, $(C_1-C_{20})$hydroxyl;
one or more polymers covalently attached to one or more polyaromatic compounds, wherein the polymer has repeating units of five or greater;
one or more rheology modifiers;
one or more surfactants; and
an aqueous solution; and
combining the viscosity reducer composition and crude oil to form an emulsion, wherein the emulsion has a volume ratio of the crude oil to the viscosity reducer composition from 50:50 to 90:10, thereby reducing the viscosity of the crude oil.

* * * * *